(12) United States Patent
Singh

(10) Patent No.: US 12,124,921 B2
(45) Date of Patent: Oct. 22, 2024

(54) INFORMATION SECURITY USING QUANTUM ENCODING

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 935 days.

(21) Appl. No.: 17/165,131

(22) Filed: Feb. 2, 2021

(65) Prior Publication Data

US 2022/0245496 A1    Aug. 4, 2022

(51) Int. Cl.
     *G06N 10/00*      (2022.01)
     *G06V 30/40*      (2022.01)

(52) U.S. Cl.
     CPC ............. *G06N 10/00* (2019.01); *G06V 30/40* (2022.01)

(58) Field of Classification Search
     CPC ........ G06N 10/00; G06N 10/40; G06N 10/20; G06V 30/40
     See application file for complete search history.

(56) References Cited

U.S. PATENT DOCUMENTS

| | | | |
|---|---|---|---|
| 6,023,508 A | 2/2000 | Bombard et al. | |
| 6,314,189 B1 | 11/2001 | Motoyoshi et al. | |
| 7,113,598 B2 | 9/2006 | Flusberg et al. | |
| 7,248,695 B1 | 7/2007 | Beal et al. | |
| 7,274,791 B2 | 9/2007 | van Enk | |
| 7,359,512 B1 | 4/2008 | Elliot | |
| 7,460,670 B1 | 12/2008 | Elliott | |
| 7,512,242 B2 | 3/2009 | Pearson et al. | |
| 7,627,126 B1 | 12/2009 | Pikalo et al. | |
| 7,646,873 B2 | 1/2010 | Lee et al. | |
| 7,702,106 B2 | 4/2010 | Mimih et al. | |
| 7,706,535 B1 | 4/2010 | Pearson et al. | |
| 7,831,048 B2 | 11/2010 | Kastella et al. | |
| 7,853,020 B2 | 12/2010 | Beal et al. | |
| 7,881,472 B2 | 2/2011 | Matsumoto | |
| 7,889,868 B2 | 2/2011 | Wellbrock et al. | |
| 7,983,422 B2 | 7/2011 | Kent et al. | |
| 8,082,443 B2 | 12/2011 | Troxel et al. | |

(Continued)

FOREIGN PATENT DOCUMENTS

| EP | 0717897 B1 | 6/1996 |
|---|---|---|
| EP | 2859679 B1 | 9/2020 |

(Continued)

*Primary Examiner* — Pei Yong Weng

(57) ABSTRACT

A device that is configured to obtain an image of a document and to convert the image into a binary bit string. The device is further configured to iteratively select portions of the binary bit string, to determine a binary bit value for a selected portion of the binary bit string, and to identify a quantum logic gate from an encoding map based on the binary bit value. The encoding map is configured to map binary bit values to quantum logic gates. The device is further configured to add an identifier for the identified quantum logic gate to a set of encoding instructions. The encoding instructions contain commands for applying quantum logic gate operations to qubits. The device is further configured to send the set of encoding instructions to a quantum computing network device that is configured to generate qubits and to transmit qubits.

20 Claims, 4 Drawing Sheets

(56) References Cited

U.S. PATENT DOCUMENTS

| | | |
|---|---|---|
| 8,483,394 B2 | 7/2013 | Nordholt et al. |
| 8,693,691 B2 | 4/2014 | Jacobs |
| 8,897,449 B1 * | 11/2014 | Broadbent ............ H04L 9/0891 |
| | | 380/278 |
| 9,002,009 B2 | 4/2015 | Northolt et al. |
| 9,819,418 B2 | 11/2017 | Nordholt et al. |
| 10,171,238 B2 | 1/2019 | Howe et al. |
| 10,728,029 B1 | 7/2020 | Vakili |
| 2004/0184615 A1 | 9/2004 | Elliott et al. |
| 2005/0190921 A1 | 9/2005 | Schlafer et al. |
| 2005/0286723 A1 | 12/2005 | Vig et al. |
| 2007/0130455 A1 | 6/2007 | Elliott |
| 2007/0133798 A1 | 6/2007 | Elliott |
| 2008/0175385 A1 | 7/2008 | Lee et al. |
| 2009/0185689 A1 | 7/2009 | Beal |
| 2011/0150220 A1 | 6/2011 | Breton et al. |
| 2013/0179995 A1 | 7/2013 | Basile et al. |
| 2014/0016779 A1 | 1/2014 | Lirakis |
| 2015/0295708 A1 | 10/2015 | Howe et al. |
| 2021/0064860 A1 * | 3/2021 | Tuma ...................... G06F 16/93 |

FOREIGN PATENT DOCUMENTS

| | | |
|---|---|---|
| GB | 2397452 B | 7/2005 |
| GB | 2491896 A | 12/2012 |
| WO | 2008015758 A1 | 2/2008 |
| WO | 2009093036 A2 | 7/2009 |

\* cited by examiner

INFORMATION SECURITY USING QUANTUM ENCODING

TECHNICAL FIELD

The present disclosure relates generally to information security, and more specifically to information security using quantum encoding.

BACKGROUND

In a network environment, devices are in data communication with other devices that may be distributed anywhere in the world. These network environments allow data and information to be shared among devices. One of the technical challenges that occurs when data is exchanged between devices is controlling data leakage and unauthorized access to data. Data storing devices, such as databases and servers, are vulnerable to online attacks. This vulnerability poses several network security challenges. For example, a bad actor may intercept data that is being transmitted through the network to gain unauthorized access to sensitive information. The sensitive information may include personal information or credentials that the bad actor can use to compromise network devices or to perform malicious activities within the network.

SUMMARY

The system disclosed in the present application provides a technical solution to the technical problems discussed above by providing an information security system that uses entangled qubits to encode classical binary bit information and to transmit the entangled qubits to a receiving device. The disclosed system provides several practical applications and technical advantages which include a process for providing enhanced information security by using qubits to transmit information instead of using classical binary bits. When a qubit is in an entangled state, the qubit is a mixture of values. The actual value of the entangled qubit is unknown until a measurement is made on the entangled qubit to determine the value of the qubit. Since the actual value of an entangled qubit is unknown until a measurement is made, a bad actor is unable to intercept or eavesdrop on the data that is being transmitted. Measuring the value of qubit is a destructive process which means that the qubit is no longer available after the measurement is made. Thus, using entangled qubits to encode and transmit information provides improved information security since the value of the qubits is unknown during transmission and a bad actor is unable to determine the values of the qubits without destroying the qubits.

In one embodiment, the system comprises a device that is configured to obtain an image of a document and to convert the image into a binary bit string. The device is further configured to iteratively select portions of the binary bit string, to determine a binary bit value for a selected portion of the binary bit string, and to identify a quantum logic gate from an encoding map based on the identified binary bit value. For example, the device may iteratively select two bits from the binary bit string to encode using qubits. The encoding map is configured to map binary bit values to quantum logic gates or quantum logic gate operations. The device is further configured to add an identifier for the identified quantum logic gate to a set of encoding instructions. The encoding instructions contain commands for applying quantum logic gate operations to qubits. The device is further configured to send the set of encoding instructions to a quantum computing network device that is configured to generate qubits in accordance with the encoding instructions and to transmit the qubits to a quantum computing receiving device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
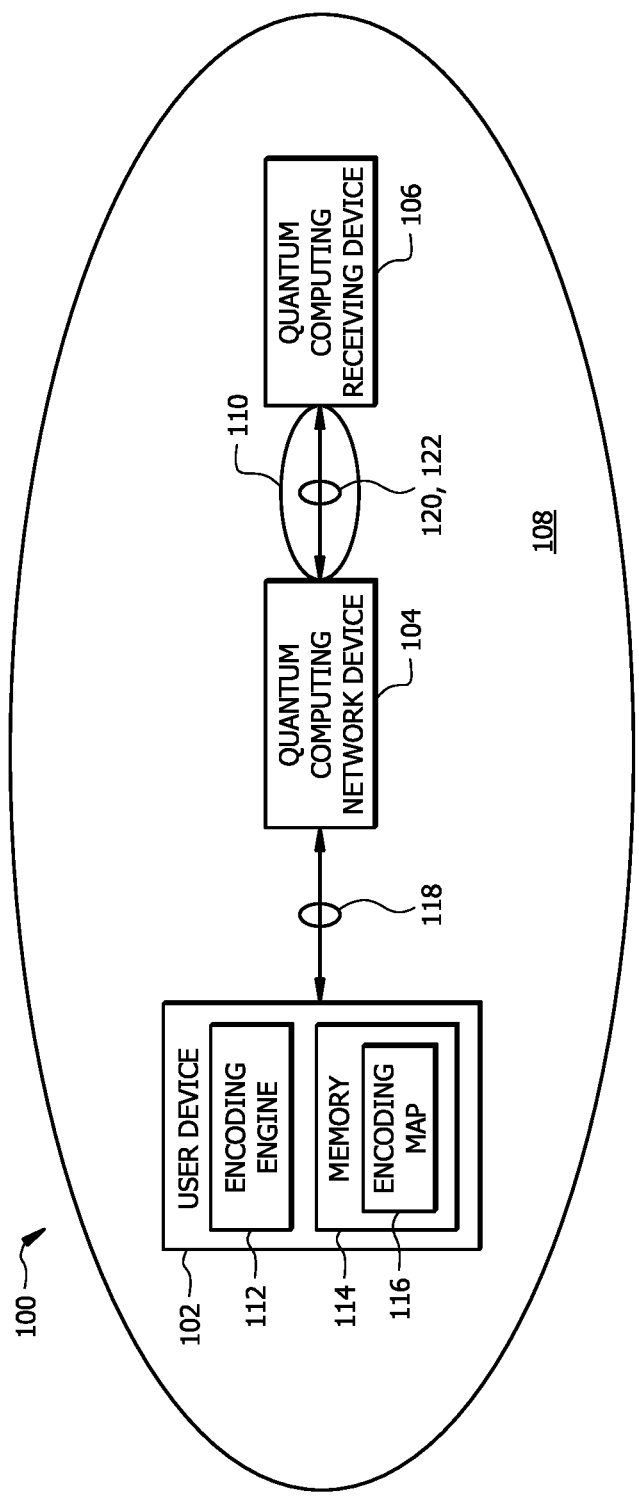
FIG. 1 is a schematic diagram of an embodiment of an information security system that is configured to use quantum encoding.

FIG. 1 is a schematic diagram of an embodiment of an information security system 100 that is configured to encoding and transmit information using quantum bits, also known as qubits. The information security system 100 is generally configured to use entangled qubits to encode classical binary bit information and to transmit the entangled qubits to a receiving device. When a qubit is in an entangled state, the qubit is a mixture of values. The actual value of the entangled qubit is unknown until a measurement is made on the entangled qubit to determine the value of the qubit. However, measuring the value of a qubit is a destructive process which means that the qubit is no longer available after the measurement is made. Using entangled qubits to encode and transmit information provides improved information security since the value of the qubits is unknown during transmission. In addition, a bad actor is unable to intercept the qubits and to determine the values of the qubits without destroying the qubits.

Network

The information security system 100 comprises one or more user devices 102, a quantum computing network device 104, and one or more quantum computing receiving devices 106 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

Quantum Network

The quantum computing network device 104 and a quantum computing receiving device 106 are also in signal communication with each other using a quantum network 110. The quantum network 110 is configured to facilitate the transmission of information using qubits. The quantum network 110 may comprise optical fibers, optical switches, repeaters, and/or any suitable type of hardware and communication channels for transmitting and receiving qubits.

Quantum Computing Devices

The quantum computing network device 104 and the quantum computing receiving device 106 may each comprise a quantum processing unit (QPU), a qubit signal amplifier, input microwave lines, superconducting coaxial lines, a mixing chamber, cryogenic isolators, quantum amplifiers, a cryoperm shield, quantum logical gates, and/or any other suitable components for generating and/or processing qubits. The quantum computing network device 104 is configured to generate qubits 120, to encode data using qubits 120 based on a set of encoding instructions 118, and to transmit qubits 120 over the quantum network 110. The quantum computing receiving device 106 is configured to receive qubits 120 and to convert the qubits 120 into binary bit values to recover the encoded data. An example of the quantum computing network device 104 and the quantum computing receiving device 106 in operation is described in FIGS. 2 and 3. In some embodiment, the quantum computing network device 104 and the quantum computing receiving device 106 may each integrated with or configured to work cooperatively with a traditional computing device such as a desktop computer or a laptop.

User Device

Examples of the user device 102 include, but are not limited to, a smartphone, a tablet, a smartwatch, a laptop, a computer, or any other suitable type of user device. The user device 102 is generally configured to generate encoding instructions 118 for encoding binary bit data as qubits 120. An example of the user device 102 in operation is described below in FIG. 2. In one embodiment, the user device 102 comprises an encoding engine 112 and a memory 114. The user device 102 may further comprise a graphical user interface, a display, a touch screen, buttons, a camera, or any other suitable combination of components. Additional details about the hardware configuration of the user device 102 are described in FIG. 4.

Figure 3:
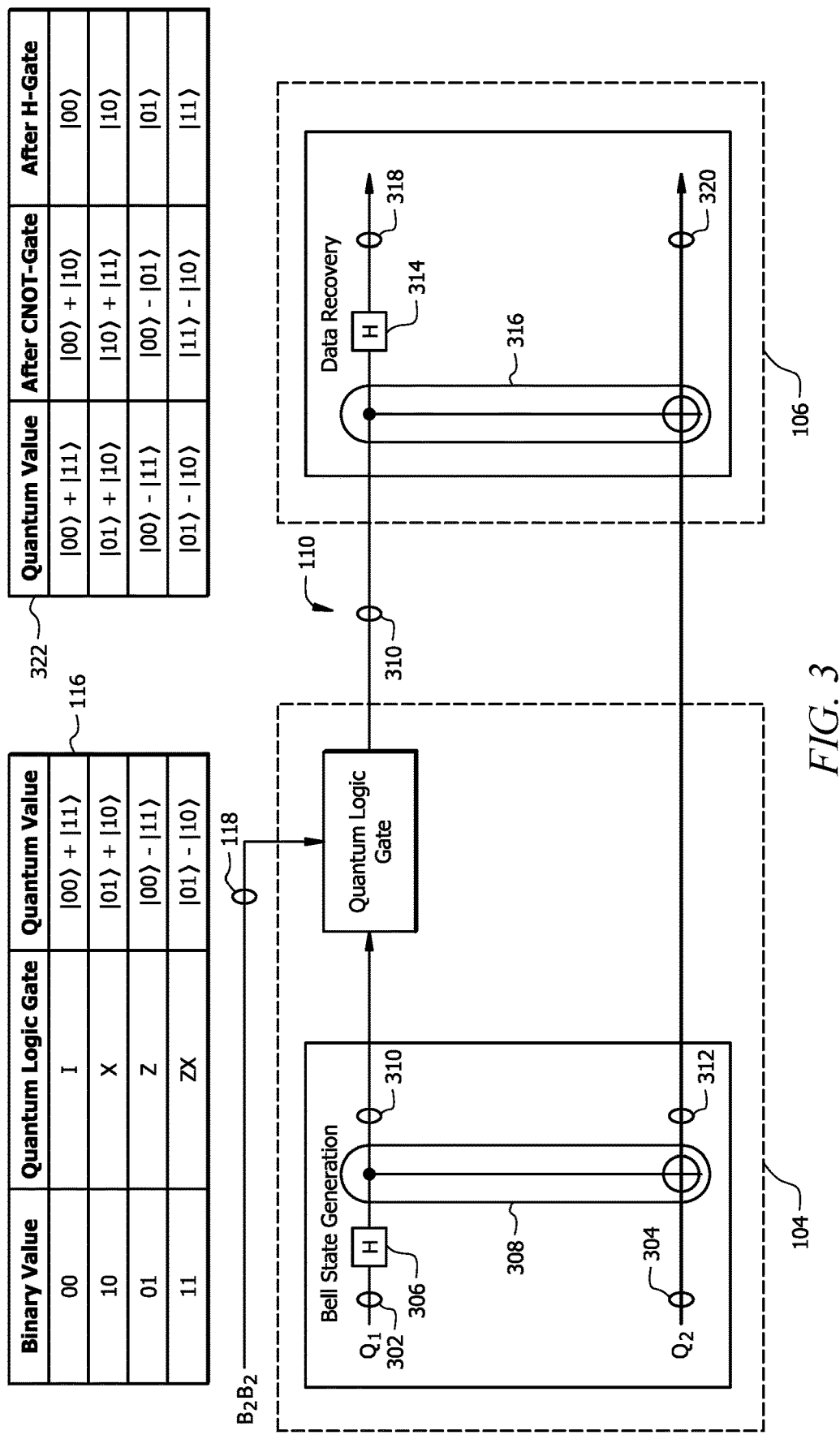
FIG. 3 is an embodiment of a quantum network configuration.

The memory 114 is configured to store an encoding map 116 and/or any other suitable type of data. The encoding map 116 is configured to map binary bit values to quantum logic gates or quantum logic gate operations. Examples of quantum logic gates include, but are not limited to, an Identity quantum logic gate, a NOT quantum logic gate, a Pauli-Z quantum logic gate, a NOT Pauli-Z quantum logic gate, and any other suitable type of quantum logic gate. An example of an encoding map 116 is shown in FIG. 3.

The encoding engine 112 is generally configured to generate encoding instructions 118 for encoding binary bit data as qubits 120. For example, the encoding engine 112 may be configured to encode a binary bit string that represents some data using qubits 120. The data may be an image, a video, text, a document, an audio file, or any other suitable type of data. In this example, the encoding engine 112 parses the binary bit string to identify binary bit values within the binary bit string. The encoding engine 112 then uses the encoding map 116 to identify quantum logic gates or quantum logic gate operations that correspond with the identified binary bit values. The encoding engine 112 then uses the identified quantum logic gates or quantum logic gate operations to generate a set of encoding instructions 118. The encoding instructions 118 comprise commands for applying quantum logic gate operations to qubits 120. The encoding engine 112 sends the set of encoding instructions 118 to the quantum computing network device 104 which triggers the quantum computing network device 104 to generate qubits 120 based on the encoding instructions 118 and to transmit the qubits 120 to the quantum computing receiving device 106. An example of the encoding engine 112 in operation is described in FIG. 2.

Data Transfer Process Using Quantum Encoding

Figure 2:
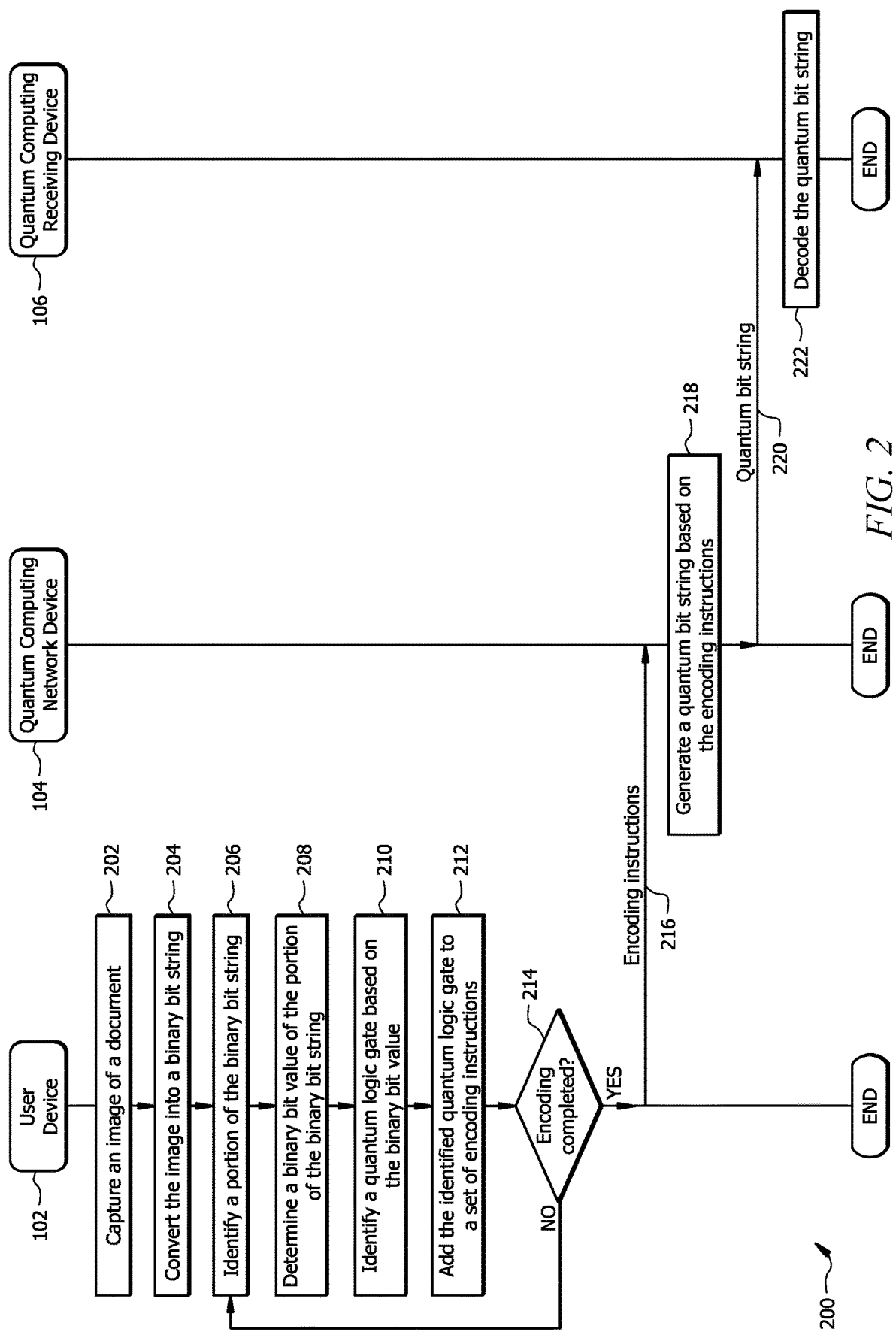
FIG. 2 is a flowchart of an embodiment of a data transfer process using quantum encoding.

FIG. 2 is a flowchart of an embodiment of a data transfer process 200 using quantum encoding. The information security system 100 may employ process 200 to use entangled qubits 120 to encode classical binary bit information and to transmit the entangled qubits 120 to a quantum computing receiving device 106. Since the actual state or value of an entangled qubit 120 is unknown until a measurement is made, a bad actor is unable to intercept or eavesdrop on the data that is being transmitted. Measuring the value of qubits 120 is a destructive process which means that the qubit 120 is no longer available after the measurement is made. Thus, using entangled qubits 120 to encode and transmit information provides improved information security since the value of the qubits 120 is unknown during transmission and a bad actor is unable to determine the values of the qubits 120 without destroying the qubits 120.

At step 202, the user device 102 captures an image of a document. For example, a user may use a camera 308 on the user device 102 to capture an image of a document or a portion of a document. The document may comprise text, handwriting, signatures, symbols, or any other type of information. As an example, the document may contain sensitive or confidential information that the user would like to send using quantum encoding. In other examples, the image may be generated or downloaded onto the user device 102.

At step 204, the user device 102 converts the image into a binary bit string. The binary bit string comprises a sequence of binary bit values that represents the image. In some embodiments, the user device 102 may be configured to extract a portion of the image and to convert the extracted portion of the image into a binary bit string. For example, the user device 102 may use text recognition or optical character recognition (OCR) to identity and extract text, handwriting, signatures, or symbols within the image. The user device 102 then converts the extracted information from the image into a binary bit string. In other examples, the user device 102 may convert any other suitable type of data into a binary bit string. For example, the user device 102 may convert a video, text, a document, an audio file, or any other suitable type of data into a binary bit string.

At step 206, the user device 102 identifies a portion of the binary bit string. Here, the user device 102 is configured to iteratively select a portion of the binary bit string to encode using qubits 120. This process allows the user device 102 to segment the binary bit string into smaller units that can be encoded using qubits 120. In one embodiment, the user device 102 is configured to segment the binary bit string into two-bit segments. In this example, the user device 102 will iteratively select two binary bits from the binary bit string to encode using qubits 120. In other examples, the user device 102 may select any other suitable number of binary bits.

At step 208, the user device 102 determines a binary bit value of the portion of the binary bit string. Here, the user device 102 identifies the value of the sequence of binary bits that are within the selected portion of the binary bit string.

Continuing with the previous example where the user device 102 selects two bits at a time, the possible binary bit values are "00," "01," "10," and "11."

At step 210, the user device 102 identifies a quantum logic gate based on the binary bit value. The user device 102 uses the encoding map 116 to identify a quantum logic gate or quantum logic gate operation that corresponds with the determined binary bit value. Referring to FIG. 3 as an example, the encoding map 116 is configured to map a binary bit value of "00" with an Identity quantum logic gate, a binary bit value of "10" with a NOT quantum logic gate, a binary bit value of "01" with a Pauli-Z quantum logic gate, and a binary bit value of "11" with a NOT Pauli-Z quantum logic gate. In other examples, the encoding map 116 may be configured with any other suitable mapping between binary bit values and quantum logic gates or quantum logic gate operations. In FIG. 3, the encoding map 116 is represented as a table. In other examples, the encoding map 116 may be represented using any other suitable type of data structure.

At step 212, the user device 102 adds the identified quantum logic gate or quantum logic gate operation to a set of encoding instructions 118. Here, the user device 102 adds an identifier for the identified quantum logic gate or quantum logic gate operation to a set of encoding instructions 118 that will be sent to the quantum computing network device 104. The encoding instructions 118 comprise a sequence of commands that the quantum computing network device 104 will use to modify qubits 120 that are transmitted to the quantum computing receiving device 106. The identifier for the identified quantum logic gate may be a name, a code, or any other suitable type of alphanumeric identifier that uniquely identifies a particular quantum logic gate or quantum logic gate operation. In one example, the user device 102 may use the identified binary bit value as the identifier for the quantum logic gate or quantum logic gate operation.

Returning to FIG. 2 at step 214, the user device 102 determines whether encoding the binary bit string is complete. The user device 102 determines that the encoding of the binary bit string is complete when encoding instructions 118 have been generated for all of the binary bit values in the binary bit string. The user device 102 returns to step 206 in response to determining that the encoding of the binary bit string is not complete. In this case, the user device 102 returns to step 206 to continue extracting binary bits from the binary bit string and generating encoding instructions 118 for the extracted binary bits.

The user device 102 proceeds to step 216 in response to determining that the encoding of the binary bit string is complete. In this case, the user device 102 determines that the binary bit string has been encoded and sends the encoding instructions 118 to quantum computing network device 104 for processing. At step 216, the user device 102 sends the encoding instructions to the quantum computing network device 104. In one embodiment, the user device 102 may also send a target identifier that identifies an intended receiver for the encoded data. The target identifier may be a device identifier (e.g. a Media Access Control (MAC) address or an Internet Protocol (IP) address), a device name, an alphanumeric code or identifier, or any other suitable type of identifier. The quantum computing network device 104 may use the target identifier to identify a quantum computing receiving device 106 that will receive the encoded data.

At steps 218 and 220, the quantum computing network device 104 generates a qubit string 122 based on the encoding instructions 118 and sends the qubit string 122 to a quantum computing receiving device 106, respectively. FIG. 3 illustrates an example of a qubit generation and transmission process for the quantum computing network device 104. In this example, the quantum computing network device 104 begins by generating two qubits 302 and 304. The quantum computing network device 104 may employ any suitable process or technique for generating qubits 302 and 304. The qubits 302 and 304 may be initialized to any value. In the example shown in FIG. 3, the first qubit 302 may be initialized to a qubit value of "0" and the second qubit 304 may also be initialized to a qubit value of "0."

After generating the qubits 302 and 304, the quantum computing network device 104 entangles the qubits 302 and 304 into Bell States where the actual state and value of the entangled qubits becomes unknown until a measurement is made by the quantum computing receiving device 106. In one embodiment, the quantum computing network device 104 entangles the qubits 302 and 304 by first applying a Hadamard quantum logic gate 306 to the first qubit 302 to generate a first portion of the entangled qubit 310. The quantum computing network device 104 then applies a CNOT quantum logic gate 308 to the first portion of the entangled qubit 310 and the second qubit 304 to generate a second portion of the entangled qubit 312. After entangling the qubits 302 and 304, the quantum computing network device 104 sends the second portion of the entangled qubit 312 to the quantum computing receiving device 106 via the quantum network 110. In one embodiment, the quantum computing network device 104 may use a target identifier that was provided by the user device 102 to identify a quantum computing receiving device 106 that will receive the entangled qubits.

The quantum computing network device 104 then uses the encoding instructions 118 to encode the first portion of the entangled qubit 310. The quantum computing network device 104 will iteratively select encoding instruction 118 commands to apply to the first portion of the entangled qubit 310 before sending the first portion of the entangled qubit 310 to the quantum computing receiving device 106. The quantum computing network device 104 encodes the first portion of the entangled qubit 310 by identifying a quantum logic gate or quantum logic operation from the encoding instructions 118 from the encoding instructions 118 and then applying the quantum logic operation to the first portion of the entangled qubit 310. As an example, the quantum computing network device 104 may use a programmable quantum logic gate 314 that can be reconfigured based on the commands in the encoding instructions 118. After applying the quantum logic operation to the first portion of the entangled qubit 310, the quantum computing network device 104 sends the first portion of the entangled qubit 310 to the quantum computing receiving device 106 using the quantum network 110.

In this example, each encoding instruction 118 command corresponds with two binary bit values from the encoded binary bit string. The quantum computing network device 104 will repeat this process until all of the encoding instruction 118 commands have been executed. The quantum computing network device 104 determines that the encoded data has been successfully transmitted to the quantum computing receiving device 106 as a qubit string 122 once all of the encoding instruction 118 commands have been executed.

Returning to FIG. 2 at step 222, the quantum computing receiving device 106 decodes the qubit string 122. FIG. 3 also illustrates an example of a data recovery process for the quantum computing receiving device 106. In this example, the quantum computing receiving device 106 is configured to recover the encoded data by first applying a CNOT quantum logic gate 316 to the first portion of the entangled qubit 310 and the second portion of the entangled qubit 312. The quantum computing receiving device 106 then applies a Hadamard quantum logic gate 314 to the first portion of the entangled qubit 310. An example of the results 322 of applying the CNOT quantum logic gate 316 and the Hadamard quantum logic gate 314 is provided in FIG. 3. After applying the CNOT quantum logic gate 316 and the Hadamard quantum logic gate 314, the quantum computing receiving device 106 can then measure the value of the first portion of the entangled qubit 310 and the second portion of the entangled qubit 312 to obtain qubits 318 and 320. The value of qubits 318 and 320 is the same as the original binary bit values that were encoded. For example, an encoded binary bit value of "11" will result in qubit values of "11." The quantum computing receiving device 106 repeats this process until the qubit string 122 has been decoded and the original data has been recovered.

Hardware Configuration

Figure 4:
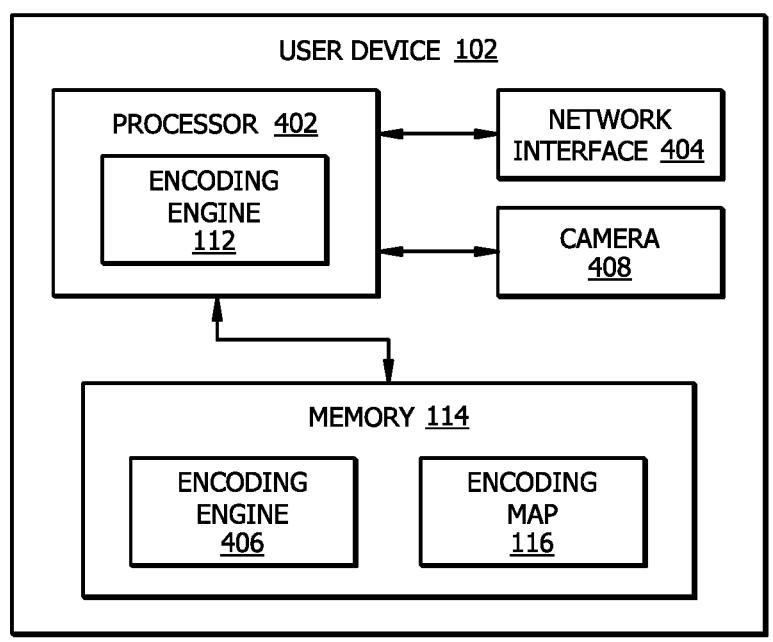
FIG. 4 is an embodiment of a device configured to use quantum encoding.

FIG. 4 is an embodiment of a device (e.g. user device 102) of an information security system 100. As an example, the user device 102 comprises a processor 402, a memory 114, a camera 408, and a network interface 404. The user device 102 may be configured as shown or in any other suitable configuration.

Processor

The processor 402 comprises one or more processors operably coupled to the memory 114, the camera 408, and the network interface 404. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 114, the camera 408, and the network interface 304. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute encoding instructions 406 to implement the encoding engine 112. In this way, processor 402 may be a special-purpose computer designed to implement the functions disclosed herein. In an embodiment, the encoding engine 112 is implemented using logic units, FPGAs, ASICs, DSPs, or any other suitable hardware. The encoding engine 112 is configured to operate as described in FIGS. 1 and 2. For example, the encoding engine 112 may be configured to perform the steps of process 200 as described in FIG. 2.

Camera

Examples of the camera 408 include, but are not limited to, charge-coupled device (CCD) cameras and complementary metal-oxide-semiconductor (CMOS) cameras. The camera 408 is configured to capture images of people, text, and objects within a real environment. The camera 408 is configured to capture images continuously, at predetermined intervals, or on-demand. For example, the camera 408 is configured to receive a command from a user to capture an image. In another example, the camera 408 is configured to continuously capture images to form a video stream of images. The camera 408 is operable coupled to encoding engine 112 and provides images to the encoding engine 112 for processing, for example, to identify text or features on a document.

Memory

The memory 114 is operable to store any of the information described above with respect to FIGS. 1 and 2 along with any other data, instructions, logic, rules, or code operable to implement the function(s) described herein when executed by the processor 402. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store encoding instructions 406, encoding map 116, and/or any other data or instructions. The encoding instructions 406 may comprise any suitable set of instructions, logic, rules, or code operable to execute the encoding engine 112. The encoding map 116 is configured similar to the encoding map 116 described in FIGS. 1-3.

Network Interface

The network interface 404 is configured to enable wired and/or wireless communications. The network interface 404 is configured to communicate data between the user device 102 and other devices (e.g. quantum computing network device 104 and/or quantum computing receiving device 106), systems, or domains. For example, the network interface 404 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device, comprising:
   a network interface configured to communicate with a quantum computing network device, wherein the quantum computing network device is configured to:
      generate a plurality of qubits; and
      transmit the plurality of qubits;
   a memory operable to store an encoding map, wherein the encoding map is configured to map binary bit values to quantum logic gates; and
   a processor operably coupled to the network interface and the memory, configured to:
      obtain an image of a portion of a document;
      convert the image into a binary bit string;
      select a first portion of the binary bit string;
      determine a first binary bit value for the first portion of the binary bit string;
      determine a first quantum logic gate from the encoding map based on the first binary bit value;
      add a first identifier for the first quantum logic gate to a set of encoding instructions, wherein the set of encoding instructions comprise commands for applying quantum logic gate operations to the plurality of qubits;
      determine whether the first portion of the binary bit string is a last portion of the binary bit string;
      in response to determining that the first portion of the binary bit string is not the last portion of the binary bit string, select a second portion of the binary bit string;
      determine a second binary bit value for the second portion of the binary bit string;
      determine a second quantum logic gate from the encoding map based on the second binary bit value;
      add a second identifier for the second quantum logic gate to the set of encoding instructions, the first identifier being different from the second identifier;
      determine whether the second portion of the binary bit string is the last portion of the binary bit string;
      in response to determining that the second portion of the binary bit string is the last portion of the binary bit string, determine that the encoding map is complete; and
      transmit the set of encoding instructions to the quantum computing network device.

2. The device of claim 1, wherein the first portion of the binary bit string comprises two bits.

3. The device of claim 1, wherein the image comprises text from the document.

4. The device of claim 1, wherein the encoding map is configured to map:
   a binary bit value of 00 with an Identity quantum logic gate;
   a binary bit value of 10 with a NOT quantum logic gate;
   a binary bit value of 01 with a Pauli-Z quantum logic gate; and
   a binary bit value of 11 with a NOT Pauli-Z quantum logic gate.

5. The device of claim 1, wherein the first identifier for the first quantum logic gate is the first binary bit value.

6. The device of claim 1, wherein the processor is further configured to send a target identifier to the quantum computing network device, wherein the target identifier identifies a quantum computing receiving device.

7. The device of claim 1, wherein the image of the portion of the document comprises handwriting.

8. A method, comprising:
   obtaining an image of a portion of a document;
   converting the image into a binary bit string;
   selecting a first portion of the binary bit string;
   determining a first binary bit value for the first portion of the binary bit string;
   determining a first quantum logic gate from an encoding map based on the first binary bit value, wherein the encoding map is configured to map binary bit values to quantum logic gates;
   adding a first identifier for the first quantum logic gate to a set of encoding instructions, wherein the set of encoding instructions comprise commands for applying quantum logic gate operations to a plurality of qubits;
   determining whether the first portion of the binary bit string is a last portion of the binary bit string;
   in response to determining that the first portion of the binary bit string is not the last portion of the binary bit string, selecting a second portion of the binary bit string;
   determining a second binary bit value for the second portion of the binary bit string;
   determining a second quantum logic gate from the encoding map based on the second binary bit value;
   adding a second identifier for the second quantum logic gate to the set of encoding instructions, the first identifier being different from the second identifier;
   determining whether the second portion of the binary bit string is the last portion of the binary bit string;
   in response to determining that the second portion of the binary bit string is the last portion of the binary bit string, determining that the encoding map is complete; and
   transmitting the set of encoding instructions to a quantum computing network device, wherein the quantum computing network device is configured to:
      generate the plurality of qubits; and
      transmit the plurality of qubits.

9. The method of claim 8, wherein the first portion of the binary bit string comprises two bits.

10. The method of claim 8, wherein the image comprises text from the document.

11. The method of claim 8, wherein the encoding map is configured to map:
    a binary bit value of 00 with an Identity quantum logic gate;
    a binary bit value of 10 with a NOT quantum logic gate;
    a binary bit value of 01 with a Pauli-Z quantum logic gate; and
    a binary bit value of 11 with a NOT Pauli-Z quantum logic gate.

12. The method of claim 8, wherein the first identifier for the first quantum logic gate is the first binary bit value.

13. The method of claim 8, further comprising sending a target identifier to the quantum computing network device, wherein the target identifier identifies a quantum computing receiving device.

14. The method of claim 8, wherein the image of the portion of the document comprises handwriting.

15. A non-transitory computer-readable medium storing instructions that when executed by a processor cause the processor to:
  obtain an image of a portion of a document;
  convert the image into a binary bit string;
  select a first portion of the binary bit string;
  determine a first binary bit value for the first portion of the binary bit string;
  determine a first quantum logic gate from an encoding map based on the first binary bit value, wherein the encoding map is configured to map binary bit values to quantum logic gates;
  add a first identifier for the first quantum logic gate to a set of encoding instructions, wherein the set of encoding instructions comprise commands for applying quantum logic gate operations to a plurality of qubits;
  determine whether the first portion of the binary bit string is a last portion of the binary bit string;
  in response to determining that the first portion of the binary bit string is not the last portion of the binary bit string, select a second portion of the binary bit string;
  determine a second binary bit value for the second portion of the binary bit string;
  determine a second quantum logic gate from the encoding map based on the second binary bit value;
  add a second identifier for the second quantum logic gate to the set of encoding instructions, the first identifier being different from the second identifier;
  determine whether the second portion of the binary bit string is the last portion of the binary bit string;
  in response to determining that the second portion of the binary bit string is the last portion of the binary bit string, determine that the encoding map is complete; and
  transmit the set of encoding instructions to a quantum computing network device, wherein the quantum computing network device is configured to:
    generate the plurality of qubits; and
    transmit the plurality of qubits.

16. The non-transitory computer readable medium of claim 15, wherein the first portion of the binary bit string comprises two bits.

17. The non-transitory computer readable medium of claim 15, wherein the encoding map is configured to map:
  a binary bit value of 00 with an Identity quantum logic gate;
  a binary bit value of 10 with a NOT quantum logic gate;
  a binary bit value of 01 with a Pauli-Z quantum logic gate; and
  a binary bit value of 11 with a NOT Pauli-Z quantum logic gate.

18. The non-transitory computer readable medium of claim 15, wherein;
  the first identifier for the first quantum logic gate is the first binary bit value.

19. The non-transitory computer readable medium of claim 15, wherein the instructions further cause the processor to;
  send a target identifier to the quantum computing network device, wherein the target identifier identifies a quantum computing receiving device.

20. The non-transitory computer readable medium of claim 15, wherein;
  the image of the portion of the document comprises handwriting.

* * * * *